(12) United States Patent
Osborn et al.

(10) Patent No.: US 12,407,513 B2
(45) Date of Patent: Sep. 2, 2025

(54) SHARING AND REQUESTING PRIVATE DATA USING CRYPTOGRAPHY

(71) Applicant: Capital One Services, LLC, McLean, VA (US)

(72) Inventors: Kevin Osborn, Newton Highlands, MA (US); Xiaoguang Zhu, New York, NY (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 307 days.

(21) Appl. No.: 18/157,596

(22) Filed: Jan. 20, 2023

(65) Prior Publication Data

US 2024/0250820 A1    Jul. 25, 2024

(51) Int. Cl.
*H04L 9/32* (2006.01)
*H04L 9/00* (2022.01)
*H04L 9/30* (2006.01)

(52) U.S. Cl.
CPC .............. *H04L 9/3213* (2013.01); *H04L 9/30* (2013.01); *H04L 9/50* (2022.05)

(58) Field of Classification Search
CPC ............ H04L 9/3213; H04L 9/50; H04L 9/30
See application file for complete search history.

(56) References Cited

U.S. PATENT DOCUMENTS

| | | | |
|---|---|---|---|
| 2019/0319794 A1* | 10/2019 | Haldar | H04L 9/3236 |
| 2020/0320222 A1* | 10/2020 | Zhou | G06Q 50/265 |
| 2020/0351094 A1* | 11/2020 | Canterbury | H04L 9/0637 |
| 2022/0329436 A1* | 10/2022 | Gaur | H04L 9/3239 |
| 2022/0391895 A1* | 12/2022 | Weber | G06Q 20/3823 |
| 2023/0231716 A1* | 7/2023 | Mitra | H04L 9/3213 |

* cited by examiner

*Primary Examiner* — Vance M Little
(74) *Attorney, Agent, or Firm* — Foley & Lardner LLP

(57) ABSTRACT

Methods and systems are described herein for an access control system that may receive, from a device associated with a cryptography-based storage application, a blockchain operation request. The blockchain operation request may include an identifier of a cryptographic token (e.g., non-fungible token) that may store encrypted verification data encrypted using a public key associated with the cryptography-based storage application. The access control system may use an address associated with the cryptography-based storage application to send the verification data so that the verification data is decrypted and a first encoding of the decrypted data is generated by the device associated with the cryptography-based storage application. The access control system may then compare that first encoding with a second encoding made from the original verification data, and, based on the first encoding matching the second encoding, generate an authentication confirmation.

16 Claims, 8 Drawing Sheets

SHARING AND REQUESTING PRIVATE DATA USING CRYPTOGRAPHY

BACKGROUND

Information sharing is a critical part of daily life. For example, people send and receive all types of communications, and entities provide access to all types of data. However, many types of data cannot be shared with everyone. Accordingly, access controls are required to access many types of data (e.g., sensitive data, private data, etc.). For example, when a user wants to provide employment verification to another party, the user may desire that action to be private. That is, if a user is looking for a change in employment, the user may not want a current employer to know about the change but at the same time may want to be able to provide valid employment verification. To ensure that sensitive information such as employment verification information is privately and anonymously shared with appropriate people, access to that data must be authenticated. Thus, many entities use conventional authentication processes such as passwords, personal identification numbers (PIN), biometric data, etc. Those processes may work well in cases where anonymity is not required. However, they may not work well in instances where anonymous data sharing is required (e.g., in cases of employment verification). Accordingly, a mechanism is desired that would enable anonymous data sharing.

SUMMARY

One mechanism to solve the anonymous data sharing problem (e.g., in employment verification scenario) may use blockchain technology and in particular cryptographic tokens (e.g., non-fungible tokens). Therefore, methods and systems are described herein for anonymously sharing data using cryptographic tokens. An access control system may be used to perform operations described herein. In particular, the access control system may receive a request to verify employment (e.g., encoded as a blockchain operation request). The blockchain operation request may include an identifier of a cryptographic token (e.g., non-fungible token) that may store encrypted verification data encrypted using a key (e.g., a public key). That is, the encrypted verification data may be associated with a cryptographic token and may be used to verify employment of a user. The access control system may use an identifier, (e.g., a cryptographic address) associated with the cryptography-based storage application to send the verification data so that the verification data is decrypted and a first encoding of the decrypted data is generated by the device associated with the cryptography-based storage application. The cryptography-based storage application may store a private key or another suitable key associated with the requester and may perform other functions. The access control system may then compare that first encoding with a second encoding made from the original verification data and, based on the first encoding matching the second encoding, generate an authentication confirmation.

This mechanism may enable an employer to generate a cryptographic token (e.g., a non-fungible token) with employment verification data. That data may be encoded onto the cryptographic token or may be stored on a cloud system and a link (e.g., a Uniform Resource Identifier (URI)) may be encoded onto the cryptographic token. The data may be signed (e.g., with a private key of the employer) to ensure that the data being verified is in fact genuine. The employer may assign the cryptographic token to the user (e.g., the employee). The user may then transfer the token to a potential new employer to perform operations described below or may perform these operations to verify employment to the new employer. The above-described mechanism may perform the following operations to enable anonymous access to user data.

A device trying to perform the verification (e.g., a device associated with a new employer, or a device associated with the user) may initiate the verification process. Thus, the access control system may receive, from a device associated with a cryptography-based storage application, a blockchain operation request. The blockchain operation request may include an identifier of a cryptographic token. The cryptographic token may include encrypted verification data encrypted using a public key associated with the cryptography-based storage application. A cryptography-based storage application may reside on a device associated with a new employer or on a device associated with the employee providing verification data. Thus, the cryptographic token may be assigned a cryptography-based storage application associated with a new employer or to a cryptography-based storage application associated with the employee providing verification.

The access control system may determine, based on the blockchain operation request, an on-chain program associated with the cryptographic token. For example, a particular on-chain program (e.g., a smart contract) may have been created by an employer or another entity for verifying employment information. An employer may submit verification data (e.g., signed by the particular employer) for each employee through the on-chain program. The on-chain program may then generate a cryptographic token and may assign that token to a cryptography-based storage application associated with a particular employee.

The access control system may then proceed to execute the blockchain operation request by transmitting the request or modified request to a blockchain node that is able to execute the blockchain operation request. The blockchain node may store an on-chain program that is able to execute the request and/or respond to the request. Thus, in response to transmitting the blockchain operation request to a blockchain node, the access control system may receive, from the on-chain program associated with the cryptographic token, the encrypted verification data. For example, the on-chain program may receive the identifier associated with the cryptographic token and transmit back encrypted verification data encoded in that cryptographic token. In some embodiments, the cryptographic token may store a link (e.g., a URI) within the cryptographic token and the on-chain program may transmit that link back to the access control system. In some embodiments, the on-chain program may follow the link to obtain the encrypted verified data and transmit the encrypted verification data to the access control system.

The access control system may then attempt to decrypt the encrypted verification data using the cryptography-based storage application associated with the requester (e.g., the sender of the blockchain operation request). Thus, the access control system may transmit, to the device associated with the cryptography-based storage application, a command to decrypt the encrypted verification data. The access control system may include the encrypted verification data within the request. In some embodiments, the access control system may transmit the command directly to the device. However, in some embodiments, the access control system may transmit the command via the on-chain program.

The device associated with the cryptography-based storage application (e.g., the requester's device) may receive the command and decrypt the verification data. The verification data may be, for example, the employment verification data. The device may then perform an operation to verify the decrypted data. Thus, the device may generate an encoding based on the data (e.g., via an encoding algorithm such as a hashing algorithm) and transmit the encoding to the access control system. The encoding algorithm or an indicator of the encoding algorithm may be encoded into the cryptographic token. The device may then transmit the encoding to the access control system.

The access control system may verify that the verification data is genuine. Thus, the access control system may receive the encoding from the device and retrieve a second encoding generated using an encoding process on original verification data. For example, the second encoding may be stored within the cryptographic token or may be stored with the encrypted verification data and may be retrieved by following the link stored within the cryptographic token. Performing the verification in this manner prevents the verification data from travelling through the network unencrypted and, therefore, makes the process more secure. Additionally or alternatively, the access control system may transmit a command to the cryptography-based storage application to determine whether the verification is genuine by comparing a signature stored with the verification data. The signature may indicate that the verification data has been signed by the employer.

Accordingly, based on the first encoding matching the second encoding, the access control system may generate an authentication confirmation. The authentication confirmation may be a string or another suitable piece of data that indicates that authentication was successful. The access control system may transmit the authentication confirmation to the device associated with the cryptography-based storage application. In some embodiments, the verification may occur on the device associated with the cryptography-based storage application. That is, the device may, via the cryptography-based storage application, perform the encoding of the decrypted verification data and also retrieve the second encoding for comparison.

In some embodiments, upon determining that the verification is successful, the access control system may perform the blockchain operation request by submitting that request to a blockchain node. For example, the blockchain operation request may indicate that upon successful completion, the cryptographic token should be assigned back to the user (e.g., if it was assigned to the new employer for employment verification). Thus, the access control system may submit the blockchain operation request to the blockchain node for execution (e.g., using the on-chain program).

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
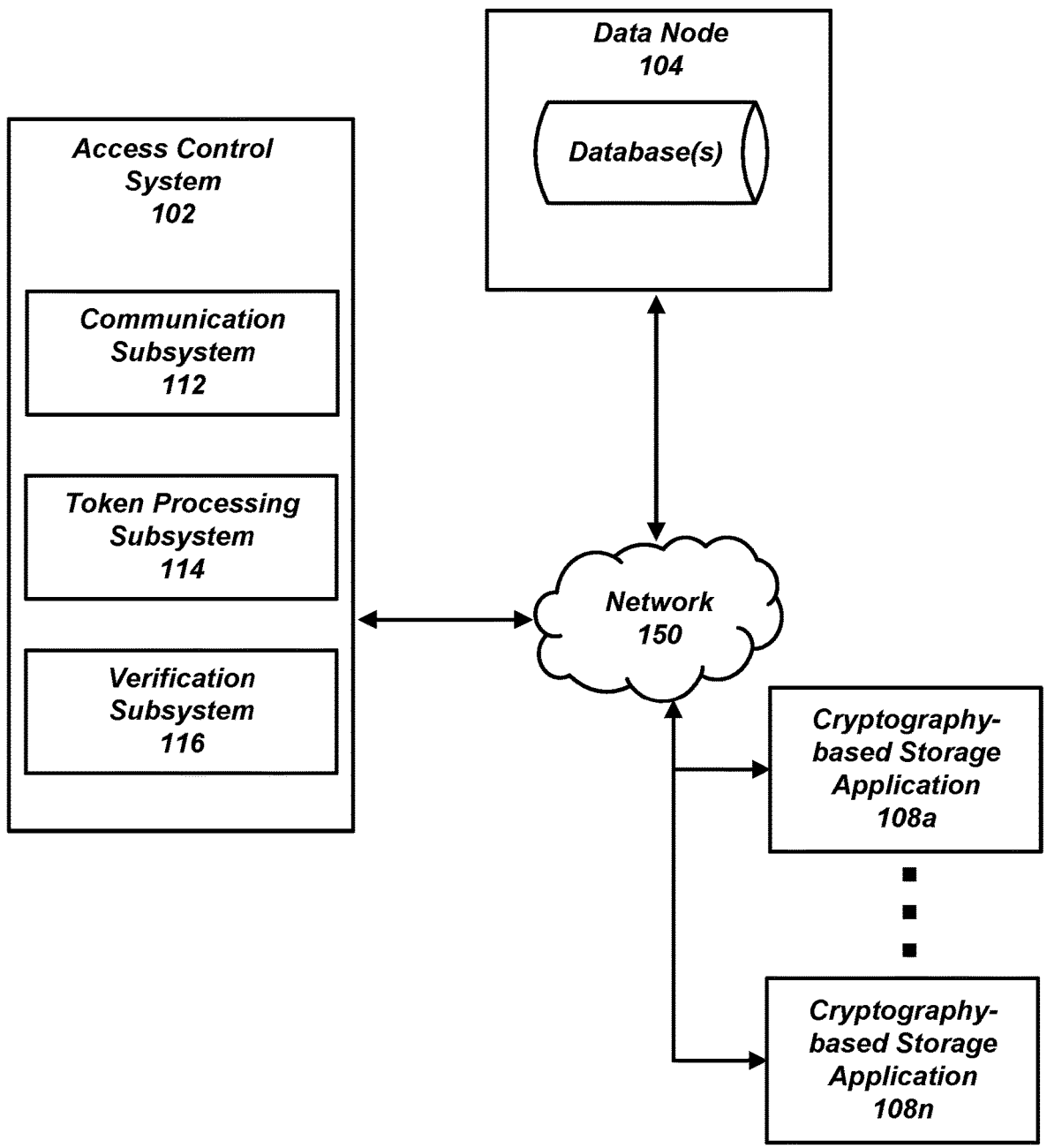
FIG. 1 shows an illustrative system for anonymously sharing data using cryptographic tokens, in accordance with one or more embodiments of this disclosure.

FIG. 1 is an example of environment 100 for anonymously sharing data using cryptographic tokens (e.g., non-fungible tokens). Environment 100 includes access control system 102, data node 104, and cryptography-based storage applications 108a-108n. Access control system 102 may execute instructions anonymously sharing data using cryptographic tokens. Access control system 102 may include software, hardware, or a combination of the two. For example, access control system 102 may be hosted on a physical server or a virtual server that is running on a physical computer system. In some embodiments, access control system 102 may be configured on a user device (e.g., a laptop computer, a smartphone, a desktop computer, an electronic tablet, or another suitable user device). Furthermore, access control system 102 may be stored on a blockchain (e.g., as a smart contract) and may execute operations on a blockchain node, which may be a computing device (e.g., a server, a desktop, or another suitable computing device). Cryptography-based storage applications 108a-108n may be used to store one or more keys (e.g., one or more private keys associated with a particular user or entity) and may perform other operations (e.g., data decryption and other operations described below). In some instances, the term cryptography-based storage application may refer to a digital wallet that is able to access a blockchain and request blockchain operations. Cryptography-based storage applications may be software applications or combinations of software and hardware. An example of a software cryptography-based storage application is Metamask®. An example of a software/hardware cryptography-based storage application is Ledger®. As described herein, cryptography-based storage applications may be supplemented with additional capabilities.

In some embodiments, one or more cryptography-based storage applications may reside on the same device as part of access control system 102. Access control system 102 may use those cryptography-based storage applications to perform operations described herein. As discussed above, each cryptography-based storage application may store one or more keys that enable the corresponding cryptography-based storage application to sign blockchain operations requests, thereby proving ownership/control of a particular cryptographic token (e.g., a non-fungible token) on a computer or another suitable user device (e.g., a smartphone, electronic tablet, etc.). A cryptographic token may be a token storing digital information (e.g., drawings, etc.) or value (e.g., monetary value), such as a fungible or non-fungible token. A cryptographic token may be written to a blockchain (e.g., minted on a blockchain) via a blockchain operation performed by a blockchain node. In some embodiments, the blockchain node may use a smart contract to write the cryptographic token to the blockchain.

Data node 104 may store various data, including user data, copies of on-chain programs, cryptography-based storage applications (e.g., including private keys), and/or other suitable data. Data node 104 may include software, hardware, or a combination of the two. For example, data node 104 may be a physical server, or a virtual server that is running on a physical computer system. In some embodiments, access control system 102 and data node 104 may reside on the same hardware and/or the same virtual server/computing device. Network 150 may be a local area network, a wide area network (e.g., the Internet), or a combination of the two.

Cryptography-based storage applications 108a-108n may include software, hardware, or a combination of the two. For example, each cryptography-based storage application may include software executed on one or multiple devices or may include hardware such as a physical device. In some cases, the cryptography-based storage application may be software and may be stored in data nodes, and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smartphones, and/or other computing devices used by end users) capable of transmitting and receiving data such as requests and/or like transactions.

Access control system 102 may receive, from a device associated with a cryptography-based storage application, a blockchain operation request. The blockchain operation request may include an identifier of a cryptographic token. The cryptographic token may be associated with encrypted verification data encrypted using a public key associated with the cryptography-based storage application. In some embodiments, access control system 102 may receive the request using communication subsystem 112. Communication subsystem 112 may include software components, hardware components, or a combination of both. For example, communication subsystem 112 may include a network card (e.g., a wireless network card and/or a wired network card) that is associated with software to drive the card.

In some embodiments, communication subsystem 112 may receive a request to verify employment information of a particular user. Communication subsystem 112 may receive the request from one of cryptography-based storage applications 108a-108n. For example, communication subsystem 112 may receive the request from a device hosting a cryptography-based storage application associated with an employer that is attempting to verify employment data for a prospective employee. The employer may have received, from the prospective employee, an identifier of a cryptographic token. In some embodiments, the request may be received from a device hosting a cryptography-based storage application associated with the prospective employee. Communication subsystem 112 may pass at least a portion of the data included in the request or a pointer to the request in memory to token processing subsystem 114.

Token processing subsystem 114 may include software components, hardware components, or a combination of both. For example, token processing subsystem 114 may include software components (e.g., capable of generating and transmitting Application Programming Interface (API) calls) that access and/or execute programs such as on-chain programs to access/generate tokens (e.g., cryptographic tokens). Token processing subsystem 114 may access the data included in the request, for example, in memory. Token processing subsystem 114 may transmit (e.g., using communication subsystem 112) a request to, for example, a blockchain node so that the blockchain node may retrieve verification data from the cryptographic token. The cryptographic token may be a data structure that has been written (e.g., minted) on the blockchain. In some embodiments, the cryptographic token may be a non-fungible token (NFT). The request may include an identifier of the cryptographic token (e.g., a token address). The identifier (e.g., the token address) may be a string of alphanumeric characters.

In response to transmitting the blockchain operation request to a blockchain node, token processing subsystem 114 may receive, from an on-chain program associated with the cryptographic token, the encrypted verification data. An on-chain program may be a computer program or any suitable code for performing computing operations. The on-chain program may be stored on a blockchain (e.g., hosted on a blockchain node) and may be executed by the blockchain node. In some cases, the on-chain program may run when predetermined conditions are satisfied. In one example, the on-chain program may be a smart contract deployed on a blockchain. The smart contract may be retrieved and executed by a blockchain node. Thus, the on-chain program may be identified by the blockchain node based on an identifier associated with the cryptographic token. In some embodiments, the on-chain program may be identified in the blockchain operation request.

Figure 2:
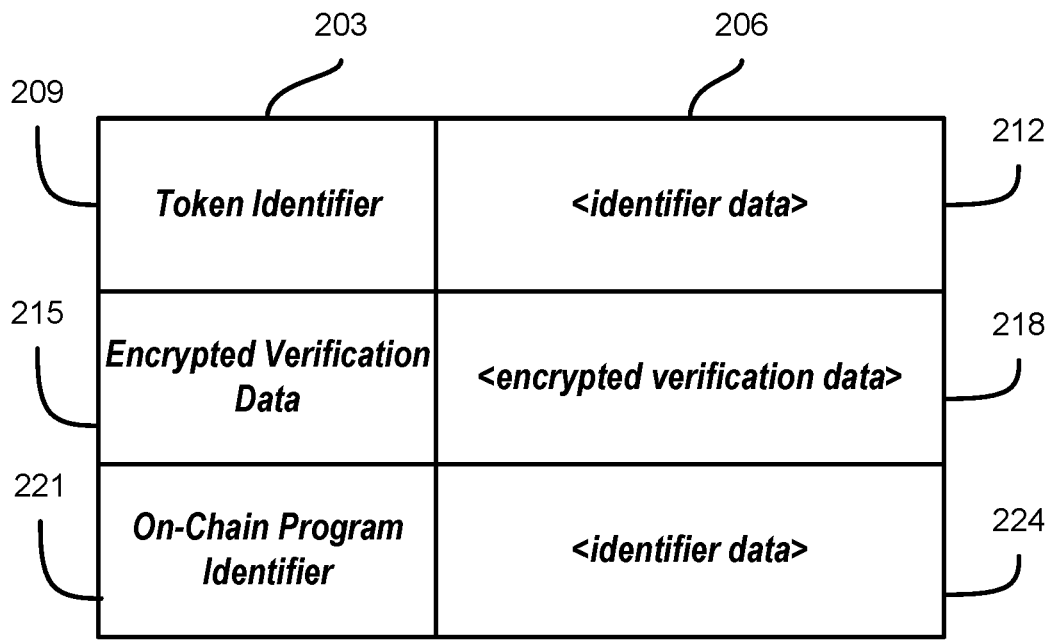
FIG. 2 illustrates an excerpt of the data associated with a cryptographic token, in accordance with one or more embodiments of this disclosure.

FIG. 2 illustrates an exemplary excerpt 200 of the data associated with a cryptographic token. Data structure 200 may include parameter fields 203 and parameter value fields 206. Identifier field 209 may indicate that the corresponding identifier value field 212 stores an identifier of the cryptographic token (e.g., a token address). Verification data field 215 may indicate that corresponding verification data value field 218 may store encrypted verification data. In some embodiments, verification data value field 218 may store a link (e.g., a URI) for retrieving the encrypted verification data. In some embodiments, the URI may point to a location (e.g., a database) on data node 104. Data structure 200 may also include an on-chain program identifier field 221 and a corresponding identifier data value field 224. This may indicate the on-chain program that was used to generate the cryptographic token and/or may be used to process requests (e.g., blockchain operation requests).

Returning to FIG. 1, token processing subsystem 114 may then pass the encrypted verification data to verification subsystem 116 to decrypt the encrypted verification data and verify authenticity of the data. For example, verification subsystem 116 may verify that the data is genuine. The data may indicate employee's status with a particular employer. Verification data may also include other data. For example, verification data may include a start date for the employee, salary information, and/or other suitable data. In some embodiments, each employer may generate a cryptographic token for each employee or some employees. Thus, an employee may have a corresponding cryptographic token verifying employment for each employer where the employee is working or has worked. In some embodiments, the verification data may include employee data from different employers. For example, each employer may add its verification data to the same cryptographic token, or the URI associated with the cryptographic token. The verification data for each employer may be cryptographically signed (e.g., using a cryptographic signature) so that data may be verified for authenticity. Verification subsystem 116 may include software components, hardware components, or a combination of both. For example, verification subsystem 116 may include software components (e.g., capable of generating and transmitting API calls) that access and/or execute programs such as on-chain programs to access/generate tokens (e.g., cryptographic tokens). Verification subsystem 116 may access the encrypted verification data, for example, in memory.

In some embodiments, verification subsystem 116 may identify a cryptography-based storage application that may decrypt the encrypted verification data. For example, an identifier (e.g., a blockchain address) associated with the cryptography-based storage application that is enabled to decrypt the encrypted verification data may be stored within the cryptographic token. In some embodiments, the identifier may be stored within a blockchain transaction that generated the cryptographic token or within the blockchain transaction that assigned a cryptographic token to a particular cryptography-based storage application.

Verification subsystem 116 may transmit (e.g., using communication subsystem 112), via the on-chain program, a command to decrypt the encrypted verification data. The command may include the encrypted verification data itself. In some embodiments, the command may include a link to the encrypted verification data. The link may be a URI to the encrypted verification data. Verification subsystem 116 may transmit the command to an on-chain program (e.g., a smart contract) that may then identify (e.g., based on a token address associated with the cryptographic token) the cryptography-based storage application that controls the cryptographic token and may also identify a device corresponding to the cryptography-based storage application. For example, the on-chain program may identify the device associated with the cryptography-based storage application based on an Internet Protocol (IP) address associated with the cryptography-based storage application.

In some embodiments, the user's cryptography-based storage application may control the cryptographic token. Accordingly, the on-chain program may transmit the command to the device associated with the user and the corresponding cryptography-based storage application. The transmission may not be necessarily done through the on-chain program but may be performed directly from the access control system to the device associated with the user. The command may include the encrypted verification data or a link (e.g., a URI) to the encrypted verification data. The cryptography-based storage application may use a private key to decrypt the encrypted verification data. Thus, the encrypted verification data is the data that was originally encrypted using the private key associated with the cryptography-based storage application.

In some embodiments, when the user agrees to employment verification, the user may temporarily transfer the cryptographic token to be controlled by a cryptography-based storage application associated with the new (e.g., potential) employer. Accordingly, during the transfer the encrypted verification data is decrypted using a private key associated with the user's cryptography-based storage application and re-encrypted using the public key associated with the new employer's cryptography-based storage application. In this case, the access control system may transmit the command to a device hosting the new employer's cryptography-based storage application, which may be used to decrypt the encrypted verification data. The cryptography-based storage application may use a private key associated with the employer's cryptography-based storage application to decrypt the encrypted verification data. At this point, the device associated with the user or the new employer will be in possession of the decrypted data. However, verification that the data has not been tampered with may still be needed.

Verification subsystem 116 may then receive a first encoding from the device. The device (e.g., a device associated with the new employer, or a device associated with the user) may decrypt the encrypted verification data and generate the first encoding using an encoding process on the decrypted verification data. In some embodiments, the encoding process may be indicated within the cryptographic token. For example, the encoding process may be a hashing algorithm to be executed against the verification data. In some embodiments, the indication of the encoding process may be indicated by a URI within the cryptographic token. Verification subsystem 116 may follow the URI to retrieve the indication of the encoding process. The encoding process may be helpful to avoid sending the verification data without being encrypted over the network, thus preventing exposure of the data to third parties.

Verification subsystem 116 may retrieve a second encoding generated using an encoding process on original verification data. For example, at the time the cryptographic token is created and added to the blockchain (e.g., minted) the device creating the token may take the original verification data (unencrypted) and apply an encoding algorithm to the data. The encoding algorithm may be a hashing algorithm or another suitable algorithm. In some embodiments, the second encoding may be stored as part of the cryptographic token and may be retrieved from the cryptographic token. That is, verification subsystem 116 may retrieve that second encoding from the cryptographic token. Furthermore, the second encoding may be stored with an indication of an algorithm used to generate the encoding. In some embodiments, the second encoding and the indication of the algorithm may be stored outside the cryptographic token (e.g., on a remote server). However, the cryptographic token may store a link (e.g., a URI) to the indication of the algorithm and the second encoding. Verification subsystem 116 may follow the URI to access that information.

To verify whether the verification data is genuine, verification subsystem 116 may compare the two encodings. Based on the first encoding matching the second encoding, verification subsystem 116 may generate an authentication confirmation. The authentication confirmation may be a message indicating a match, or if the encodings do not match, the authentication confirmation may indicate no match. Verification subsystem 116 may send the authentication confirmation to the device that has the verification data. For example, if the verification is being performed by a device associated with a new employer, verification subsystem 116 may send the authentication confirmation to that device. Thus, the new employer may be able to confirm that the verification data is genuine. In some embodiments, verification subsystem 116 may send the authentication confirmation to a device associated with the user if the user has initiated the verification process. The device associated with the user may be able to make the confirmation using the same process.

Verification subsystem 116 may perform one more confirmation to determine that the verification data is genuine. In some embodiments, the verification data may be signed (e.g., using a private key associated with one or more employers). Verification subsystem 116 may perform verification of each signature within the verification data to determine that the verification data is genuine.

In some embodiments, based on the first encoding matching the second encoding, verification subsystem 116 may submit the blockchain operation request to the blockchain node for performing a blockchain operation associated with the blockchain operation request. For example, if a user has transferred control of the cryptographic token to the new employer for verification, the blockchain operation request may cause the cryptographic token to be transferred back to the user. During the transfer, the verification data may be re-encrypted using a public key associated with the cryptography-based application of the user, as described above.

Prior to the cryptographic token being used in the process described above, access control system 102 may generate the cryptographic token. Access control system 102 may receive (e.g., via communication subsystem 112) from a second device associated with a second cryptography-based storage application a second blockchain operation request for generating the cryptographic token. The second blockchain operation request may include verification data and an address associated with the cryptography-based storage application. For example, an employer or a third party working on behalf of the employer may provide a service that enables generation of a cryptographic token for employment verification. The cryptographic token may be generated such that the cryptographic token is controlled by the cryptography-based storage application associated with a current employer and then transferred to be controlled by a cryptography-based storage application associated with the corresponding employee. In some embodiments, the cryptographic token may be generated directly to be controlled by a cryptography-based storage application associated with the corresponding employee.

Figure 3:
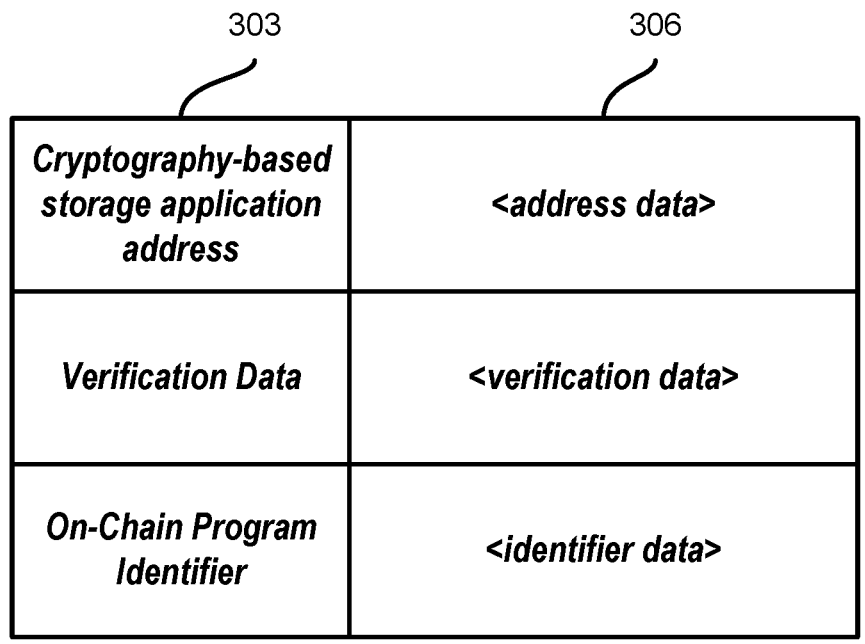
FIG. 3 illustrates data for a blockchain operation request to generate the cryptographic token, in accordance with one or more embodiments of this disclosure.

FIG. 3 illustrates a data structure 300 for a blockchain operation request to generate the cryptographic token. Data structure 300 includes name fields 303 and value fields 306. Name fields 303 may include verification data and an on-chain program identifier to use in generating the cryptographic token (e.g., minting the NFT). Value fields 306 may include corresponding values to be added to the cryptographic token.

In some embodiments, token processing subsystem 114 may be used to generate the cryptographic token. In particular, token processing subsystem 114 may retrieve the public key associated with the cryptography-based storage application. In some embodiments, the public key may be the cryptographic address associated with the cryptography-based storage application. In some embodiments, token processing subsystem 114 may retrieve the public key from another location (e.g., from data node 104).

Token processing subsystem 114 may then encrypt the verification data using the public key associated with the cryptography-based storage application. For example, token processing subsystem 114 may use an encryption algorithm with the public key to generate encrypted verification data. In some embodiments, token processing subsystem 114 may generate an encoding (e.g., a hash) of the verification data prior to encryption and encrypt both the verification data and the encoding. As discussed above, the encoding may be used to verify that the data is genuine.

Token processing subsystem 114 may generate the cryptographic token to store the encrypted verification data. For example, the cryptographic token may be generated as a data structure to be written to the blockchain. The cryptographic token may include one or more fields illustrated in FIG. 2. In some embodiments, the encrypted verification data may not include the encoding and instead the encoding may be stored outside the encrypted verification data as part of the cryptographic token. In some embodiments, the encrypted verification data may be stored outside the cryptographic token. Thus, the cryptographic token may store a URI for obtaining the encrypted verification data. In such embodiment, token processing subsystem 114 may transmit the encrypted verification data to a remote storage location (e.g., data node 104) and receive a URI for accessing that encrypted verification data. Thus, token processing subsystem 114 may put the URI into the appropriate field within the cryptographic token.

Token processing subsystem 114 may then cause execution of a second blockchain operation based on the second blockchain operation request. The second blockchain operation may record the cryptographic token to a blockchain. For example, processing subsystem 114 may format the second blockchain operation request so that a blockchain node is able to commit the cryptographic token to the blockchain node. Token processing subsystem 114 may then transmit (e.g., using communication subsystem 112) the second blockchain operation request to the blockchain node that may then write (e.g., mint) the cryptographic token onto the blockchain.

Figure 4:
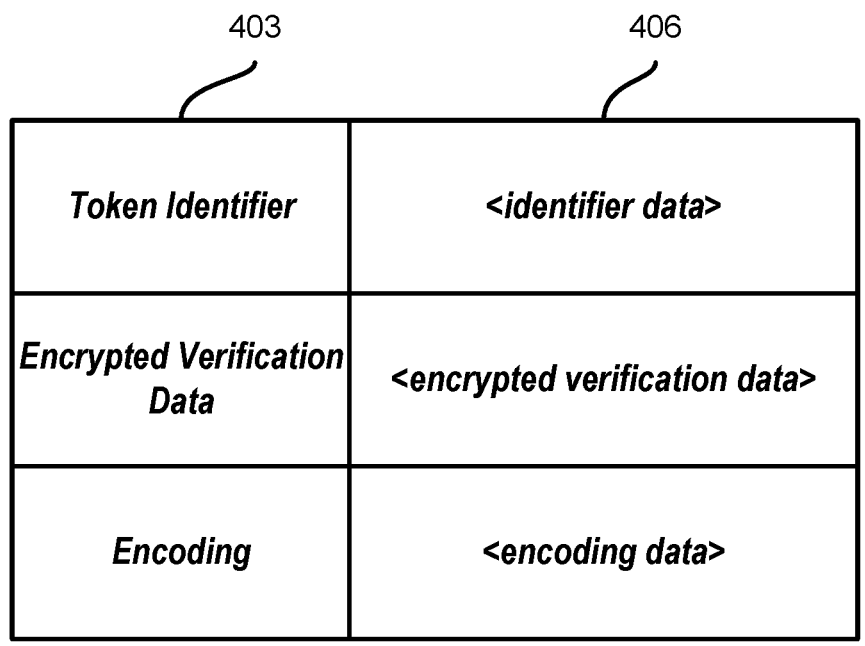
FIG. 4 illustrates additional data associated with the cryptographic token, in accordance with one or more embodiments of this disclosure.

FIG. 4 illustrates additional data 400 associated with the cryptographic token. As discussed in relation to FIG. 3, the cryptographic token may include name fields and value fields. Name fields 404 may include names of the fields within the cryptographic token. As illustrated in FIG. 4, the name fields may be token identifier, encrypted verification data, and encoding. The encoding may be, for example, a hash of the unencrypted verification data. Value fields 406 may include the corresponding values for name fields 403. In particular, the encoding value may be used in determining whether the data is genuine as described above.

In some embodiments, the encoding process may be stored within the on-chain program (e.g., with the smart contract) so that the on-chain program is able to generate a new encoding to be compared to the existing encoding. Thus, token processing subsystem 114 may place the encoding process with the on-chain program. In particular, token processing subsystem 114 may receive a token identifier associated with the cryptographic token. For example, as part of the token generation process, the blockchain node may transmit back (e.g., in response to the second blockchain operation) a cryptographic address associated with the cryptographic token. Thus, token processing subsystem 114 may transmit the token identifier and the encoding process to be stored in the on-chain program. The on-chain program may store the identifier of the cryptographic token and the encoding process to be used when the identifier of the cryptographic token is received as part of the authentication process (e.g., as described above).

In some embodiments, the cryptographic token may be used as a basis for transferring control of other cryptographic tokens to a user (e.g., as a bonus payment). The bonus payment may be made in cryptographic tokens (e.g., Bitcoin) to a wallet address (e.g., cryptography-based storage application associated with the user). Prior to the bonus payment (e.g., cryptographic tokens) being transmitted to be controlled by the user's cryptography-based storage application, the access control system may perform a verification of the cryptography-based storage application, as described above. That is, instead of or in addition to using the cryptographic token to verify employment, the above-described operations may be used to verify that the cryptography-based storage application is controlled by the user. Thus, the blockchain operation request may cause a plurality of cryptographic tokens to be assigned to be controlled by the cryptography-based storage application.

In some embodiments, access control system 102 may obtain permission from a user before generating the cryptographic token or before transmitting control of other cryptographic tokens to the user's cryptography-based storage application. In particular, access control system 102 may determine, using an application identifier associated with the second cryptography-based storage application, a user associated with the second cryptography-based storage application. For example, access control system 102 may store a plurality of cryptography-based storage application identifiers (e.g., wallet addresses) and associated user or device identifiers that control the associated cryptography-based storage application (e.g., wallet applications that control those wallet addresses). Thus, access control system 102 may identify the cryptography-based storage application associated with the cryptographic token.

Access control system 102 may generate an authorization request for the second blockchain operation request. The authorization request may prompt the user (e.g., at a device of the user) to give permission to generate the token and/or receive a payment (e.g., the bonus) using the identifier of the cryptography-based storage application, as described above. Access control system 102 may then transmit the authorization request to the user (e.g., a user device) associated with the second cryptography-based storage application. In response, access control system 102 may receive permission to proceed with creation of the cryptographic token.

Figure 5:
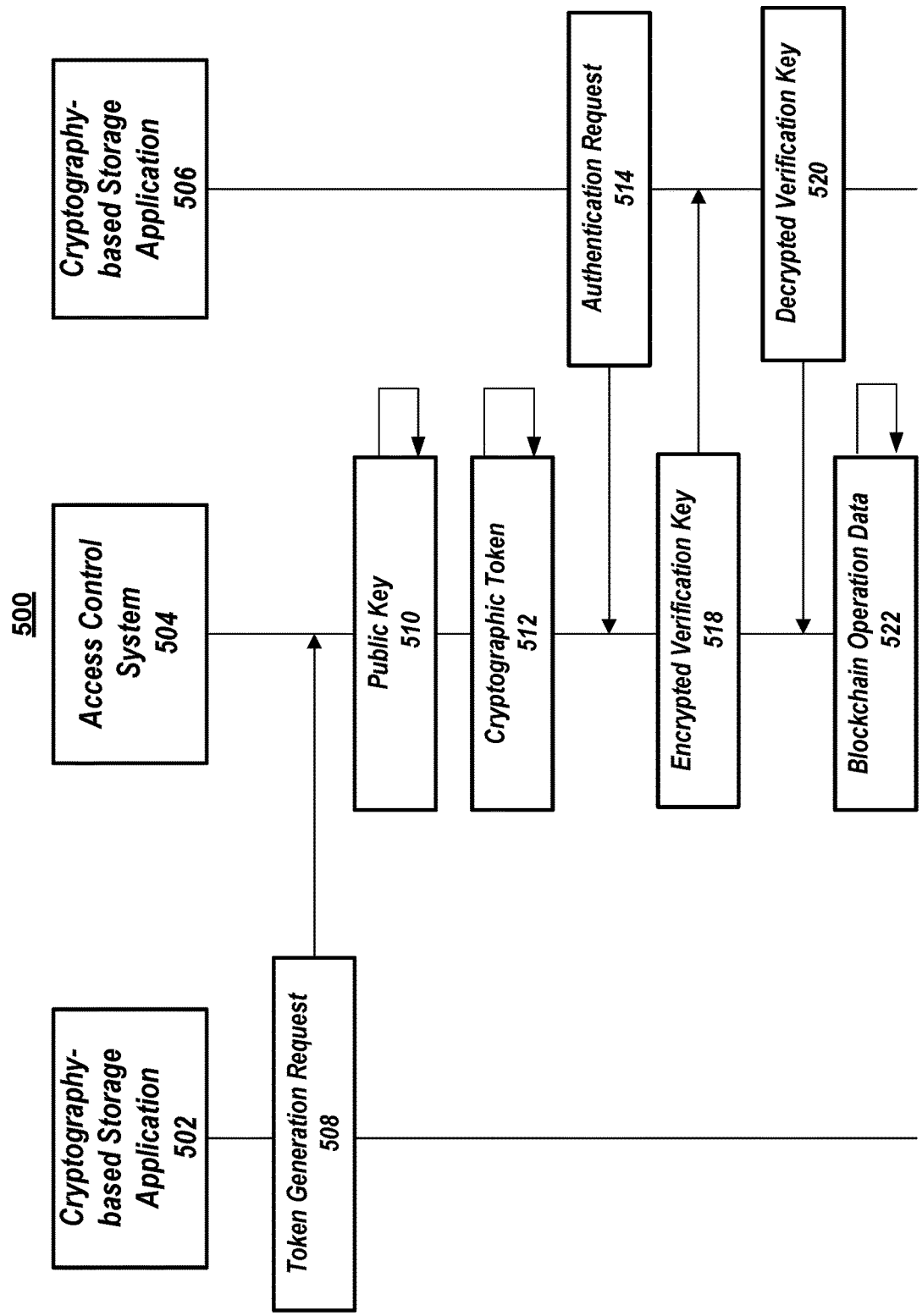
FIG. 5 illustrates a communication exchange, in accordance with one or more embodiments of this disclosure.

In some embodiments, access control system 102 may use an alternate mechanism for anonymously sharing data using cryptographic tokens. In particular, access control system 102 may use a verification key in the process. FIG. 5 illustrates a communication exchange 500 for using a verification key as part of the mechanism. FIG. 5 includes a cryptography-based storage application 502, access control system 504 and cryptography-based storage application 506. In some embodiments, access control system 504 may perform all or some operations performed by access control system 102. Thus, action control system 102 may be access control system 504. In some embodiments, access control system 504 may reside on a blockchain node. In some embodiments, cryptography-based storage application 502 may be associated with an employer that generates the cryptographic token (e.g., for employment verification and/or for a bonus payout). Thus, cryptography-based storage application 502 may generate token generation request 508 and transmit token generation request 508 to access control system 504, which may be hosted on a blockchain node. Access control system 504 may generate the cryptographic token using a public key associated with cryptography-based storage application 502 (e.g., associated with the employer) or a public key associated with cryptography-based storage application 506 (e.g., associated with the user). Thus, access control system 504 may retrieve public key 510. Public key 510 may be an address associated with a cryptography-based storage application (e.g., wallet address). Using public key 510, access control system 504 may generate cryptographic token 512.

In some embodiments, a different entity than access control system 504 may generate the cryptographic token. For example, as discussed above, access control system 102 may generate the cryptographic token by transmitting a request to a blockchain node. When generating the cryptographic token, access control system 504 (or another suitable system) may generate a verification key. The verification key may be an alphanumeric string, a number, or any other suitable verification key. Access control system 504 (or another suitable system) may encrypt the verification key (e.g., using a public key associated with cryptography-based storage application 502, cryptography-based storage application 506, or another suitable key) to generate encrypted verification key 518. Access control system 504 (or another suitable system) may then generate cryptographic token 512 with encrypted verification key 518. In some embodiments, encrypted verification key 518 may be stored on a remote server and not within the cryptographic token. Thus, cryptographic token 512 may include a URI to encrypted verification key 518. Access control system 504 (or another suitable system) may encrypt verification data using the encrypted verification key before storing that data within the cryptographic token. In some embodiments, the encrypted verification data may be stored on a remote device and not on the blockchain within the cryptographic token. Thus, cryptographic token 512 may include a URI to the encrypted verification data. Accordingly, the cryptographic token may store an encrypted verification key encrypted using a public key associated with a cryptography-based storage application and encrypted verification data encrypted using the encrypted verification key. The cryptographic token may include other data such as a token identifier (e.g., token address), controlling on-chain program, and other suitable data.

In some embodiments, access control system 504 may perform the following operations when generating the cryptographic token. Access control system 504 may receive a second blockchain operation request for generating the cryptographic token. The second blockchain operation request may include the encrypted verification data, a verification key, and an address associated with the cryptography-based storage application. As discussed above, access control system 504 may retrieve the public key associated with the cryptography-based storage application. The public key may be a wallet address associated with a wallet of the user or a wallet of the employer generating the cryptographic token.

Access control system 504 may encrypt the verification key using the public key associated with the cryptography-based storage application. For example, access control system 504 may encrypt the verification key so that the user may use the associated cryptography-based storage application (e.g., on the user's device) to decrypt the encrypted verification key. In some embodiments, the employer's device may be the one that may decrypt the encrypted verification key. Access control system 504 may generate the cryptographic token to store the encrypted verification key and the encrypted verification data. The cryptographic token may be created in the same manner as discussed above. However, in this instance the cryptographic token may store the encrypted verification key. Access control system 504 may then cause execution of a second blockchain operation based on the second blockchain operation request. The second blockchain operation may record the cryptographic token to a blockchain. The second blockchain operation may be transmitted to the blockchain node.

Access control system 504 (or another suitable system) may receive an authentication request 514. The authentication request may sometimes be referred to as a blockchain operation request. That is, access control system 504 may receive, from a user device associated with a cryptography-based storage application, a blockchain operation request. The blockchain operation request may include an identifier of a cryptographic token. As discussed above, the cryptographic token may store an encrypted verification key encrypted using a public key associated with the cryptography-based storage application and encrypted verification data encrypted using the encrypted verification key. For example, a user may want to initiate an employment verification request or a request for a bonus payment. Thus, the user may use a user device to send a request to access control system 504.

Access control system 504 (or another suitable system) may determine, based on the blockchain operation request, an on-chain program associated with the cryptographic token. For example, access control system 504 may retrieve cryptographic token 512 from the blockchain and retrieve an identifier of the on-chain program from the data of the cryptographic token. The on-chain program may store information for transmitting data to a user device (e.g., an identifier of a user device). In some embodiments, the on-chain program may access a database and retrieve a device identifier of the user device. In some embodiments, instead of using an on-chain program, access control system 504 may perform a lookup of a device identifier in a database (e.g., a database stored on data node 104).

Access control system 504 may transmit, to the user device (e.g., via the on-chain program), the encrypted verification key and a command to decrypt the encrypted verification key. For example, access control system 504 may use an identifier of the user device for addressing the transmission of the encrypted verification key. In some embodiments, access control system 504 may transmit the encrypted verification key and the command to an on-chain program which may in turn use the device identifier to transmit the encrypted verification key and the command to the user device. The user device may use a private key associated with, for example, cryptography-based storage application 506 to decrypt the encrypted verification key. The user device may then transmit decrypted verification key 520 to access control system 504. Thus, access control system 504 may receive, from the user device, a decrypted verification key.

When decrypted verification key 520 is received, access control system 504 may decrypt the encrypted verification data using the decrypted verification key. Decrypting the encrypted verification data may generate decrypted verification data. Decrypted verification data may include employment data from one or more employers. In some embodiments, decrypted verification data (or plain verification data) may include a cryptographic signature generated by the employer to confirm that the data is genuine. In some embodiments, the decrypted verification data may be instructions for paying a bonus to the user. For example, the decrypted verification data may be an identifier of a cryptography-based storage application (e.g., a wallet address) associated with the user.

In some embodiments, the decrypted verification data may include authentication information for authenticating the cryptography-based storage application. Thus, access control system 504 may authenticate the cryptography-based storage application using the decrypted verification data. In some embodiments, as discussed above, access control system 504 may use encoding comparison to authenticate the decrypted verification data. Access control system 504 may receive a first encoding generated using an encoding process based on original verification data. The first encoding may be stored within the cryptographic token and may be retrieved from that cryptographic token. In some embodiments, the encoding may be retrieved from a URI within the cryptographic token. The first encoding may be a hash of the original verification data.

Access control system 504 may generate a second encoding using the encoding process based on the decrypted verification data. As discussed above, access control system 504 may access the encoding process and use the decrypted verification data to generate the second encoding in the same manner as the first encoding was generated. In response to determining that the first encoding matches the second encoding, access control system 504 may indicate that authentication is successful.

Access control system 504 may then submit the blockchain operation request to a blockchain node for performing a blockchain operation associated with the blockchain operation request. For example, access control system 504 may submit blockchain operation data 522 to the blockchain node. In some embodiments, the blockchain operation may cause a plurality of cryptographic tokens to be assigned to be controlled by the cryptography-based storage application. For example, the blockchain operation may be an operation to pay a bonus to an employee.

Computing Environment

Figure 6:
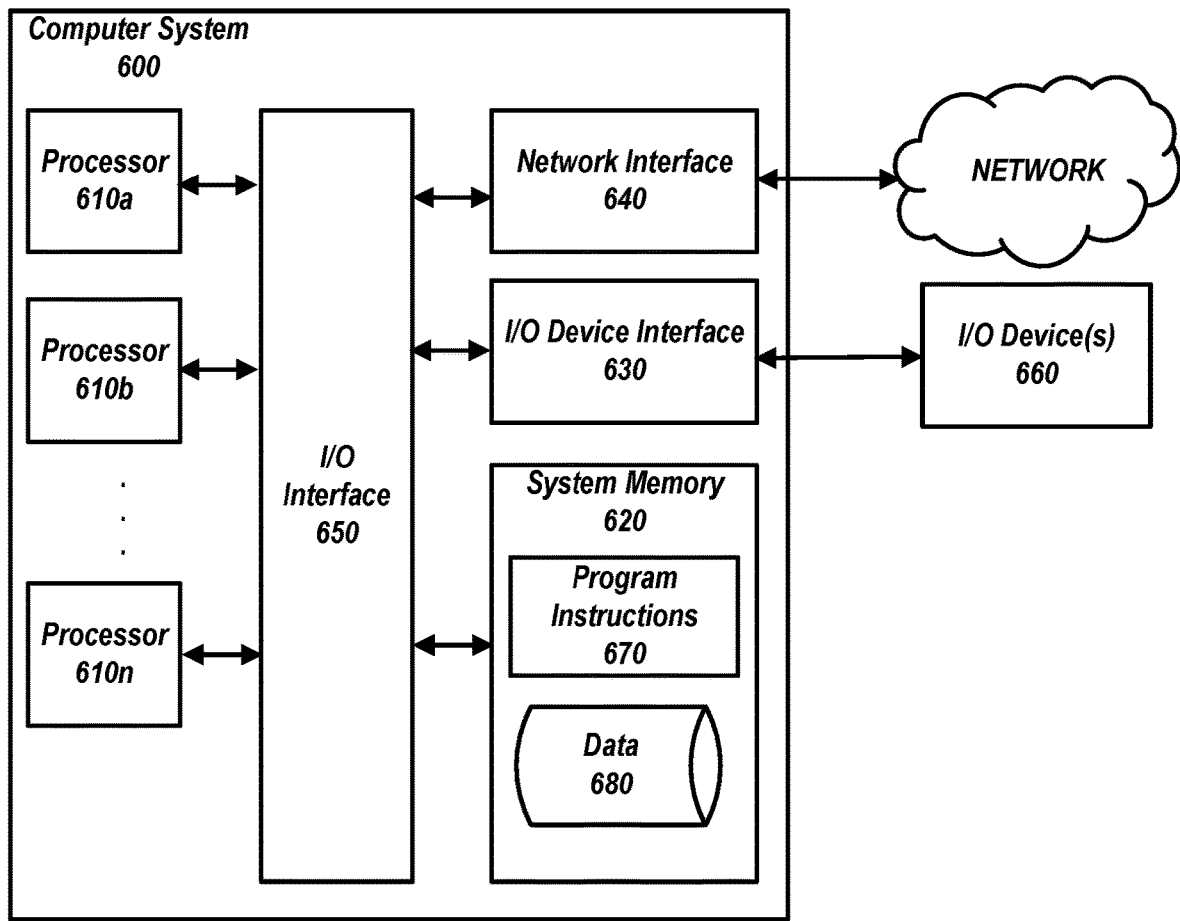
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a field-programmable gate array (FPGA) or an application-specific integrated circuit (ASIC). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random-access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Blockchain Environment

Figure 7:
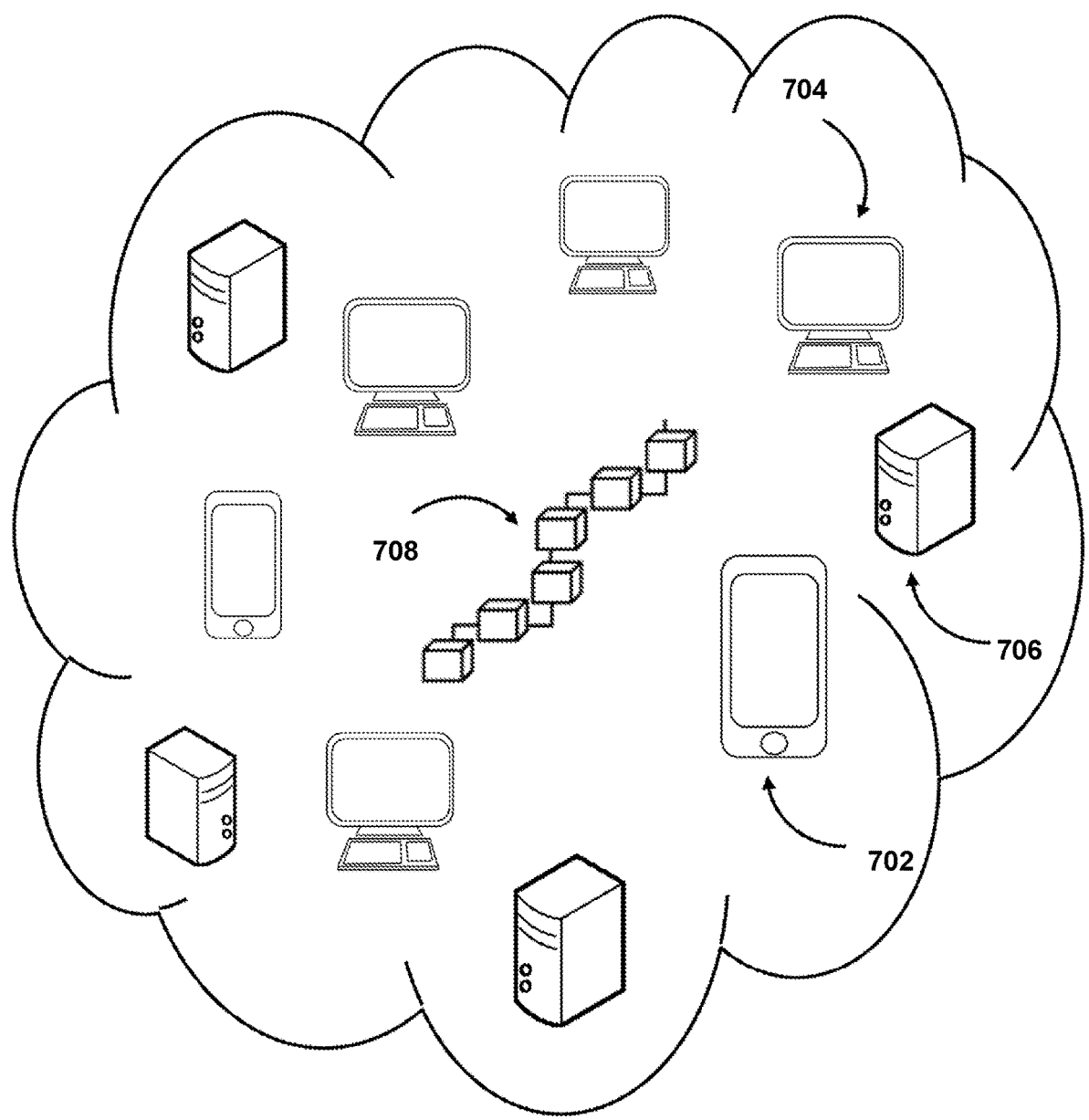
FIG. 7 shows an illustrative diagram for a decentralized environment for performing blockchain functions or operations, in accordance with one or more embodiments.

FIG. 7 shows an illustrative diagram for a decentralized environment for performing blockchain functions or operations, in accordance with one or more embodiments. For example, the diagram presents various components that may be used to allocate and distribute cryptographic resources in response to an off-chain trigger or event upon request, in some embodiments.

As shown in FIG. 7, system 700 may include multiple user devices (e.g., user device 702, user device 704, and/or user device 706). For example, system 700 may comprise a distributed state machine, in which each of the components in FIG. 7 acts as a client of system 700. For example, system 700 (as well as other systems described herein) may comprise a large data structure that holds not only all accounts and balances but also a state machine which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 700 may interact with, and facilitate the function of, blockchain 708.

It should be noted that, while shown as a smartphone, a personal computer, and a server in FIG. 7, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 700 performing a blockchain function may equally be applied to, and correspond to, an individual user device (e.g., user device 702, user device 704, and/or user device 706) performing the blockchain function. That is, system 700 may correspond to the user devices (e.g., user device 702, user device 704, and/or user device 706) collectively or individually.

Each of the user devices may be used by the system to conduct blockchain functions or operations and/or contribute to allocating and distributing cryptographic resources in response to an off-chain trigger or event upon request. As referred to herein, "blockchain functions" or "blockchain operations" may comprise any operations including and/or related to blockchains and blockchain technology. For example, blockchain functions or operations may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function or operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including an NFT. An NFT may comprise a token that is associated with a good, a service, a smart contract, and/or other content that may be verified by, and stored using, blockchain technology.

In some embodiments, blockchain functions or operations may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for enabling Turing-complete computation while limiting the resources that any smart contract and/or blockchain function may consume.

In some embodiments, gas may be obtained as part of a blockchain function or operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 7, one or more user devices may include a digital wallet (e.g., cryptography-based storage application described above) used to perform blockchain functions or operations. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet (e.g., residing on a computing device) and a cold wallet (residing on a device that is generally disconnected from a computing device and is not accessible until connected). Hot wallets are most often used to perform blockchain functions, while a cold wallet is generally used for managing a user account and may have no connection to the Internet.

One or more user devices may include a private key and a public key. In such cases, each pair comprises a public key (e.g., which may be public) and a private key (e.g., which may be kept private). Key pairs may be generated using cryptographic algorithms (e.g., featuring one-way functions). Computing devices may then encrypt a message using an intended receiver's public key such that the encrypted message may be decrypted only with the receiver's corresponding private key. In some embodiments, a message may be used in combination with a private key to create a digital signature on the message. For example, the digital signature may be used to verify the authenticity of blockchain functions or operations. As an illustration, when conducting blockchain functions, the digital signature may be used to prove to every node in the system that it is authorized to conduct the blockchain functions.

For example, system 700 may comprise a plurality of nodes for the blockchain network. A node for a blockchain network may comprise an application or other software that records and/or monitors peer connections to other nodes and/or miners for the blockchain network. For example, a miner comprises a node in a blockchain network that facilitates blockchain functions by verifying blockchain functions or operations on the blockchain, adding new blocks to the existing chain, and/or ensuring that these additions are accurate. The nodes may continually record the state of the blockchain and respond to remote procedure requests for information about the blockchain.

Following an authentication of the blockchain function, the blockchain function may be authorized. For example, after the blockchain function is authenticated between the users, system 700 may authorize the blockchain function prior to adding it to the blockchain. Blockchain function or operations may be added to blockchain 508 via blockchain nodes. The blockchain may perform this (via blockchain nodes) based on a consensus within the blockchain network. For example, system 700 may rely on a majority (or other metric) of the nodes in the community network to determine that the blockchain function or operation is valid. In response to validation of the block, a blockchain node in the community network (e.g., a miner) may receive a reward (e.g., in a given cryptocurrency) as an incentive for validating the block.

To validate the blockchain function, a blockchain node may use one or more validation protocols and/or validation (or consensus) mechanisms. For example, a blockchain node may use a Proof of Work (POW) mechanism in which a user device must provide evidence that it performed computational work to validate a blockchain function, and thus this mechanism provides for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, a blockchain node may use a Proof of Stake (POS) mechanism in which a user account (e.g., corresponding to a node on the blockchain network) is required to have, or "stake," a predetermined amount of tokens in order to be recognized as a validator in the blockchain network. In response to validation of the block, the block is added to blockchain 708, and the blockchain function is completed. For example, to add the blockchain function to blockchain 708, the successful node (e.g., the successful miner) encapsulates the blockchain function in a new block before committing it to the blockchain.

Operation Flow

Figure 8:
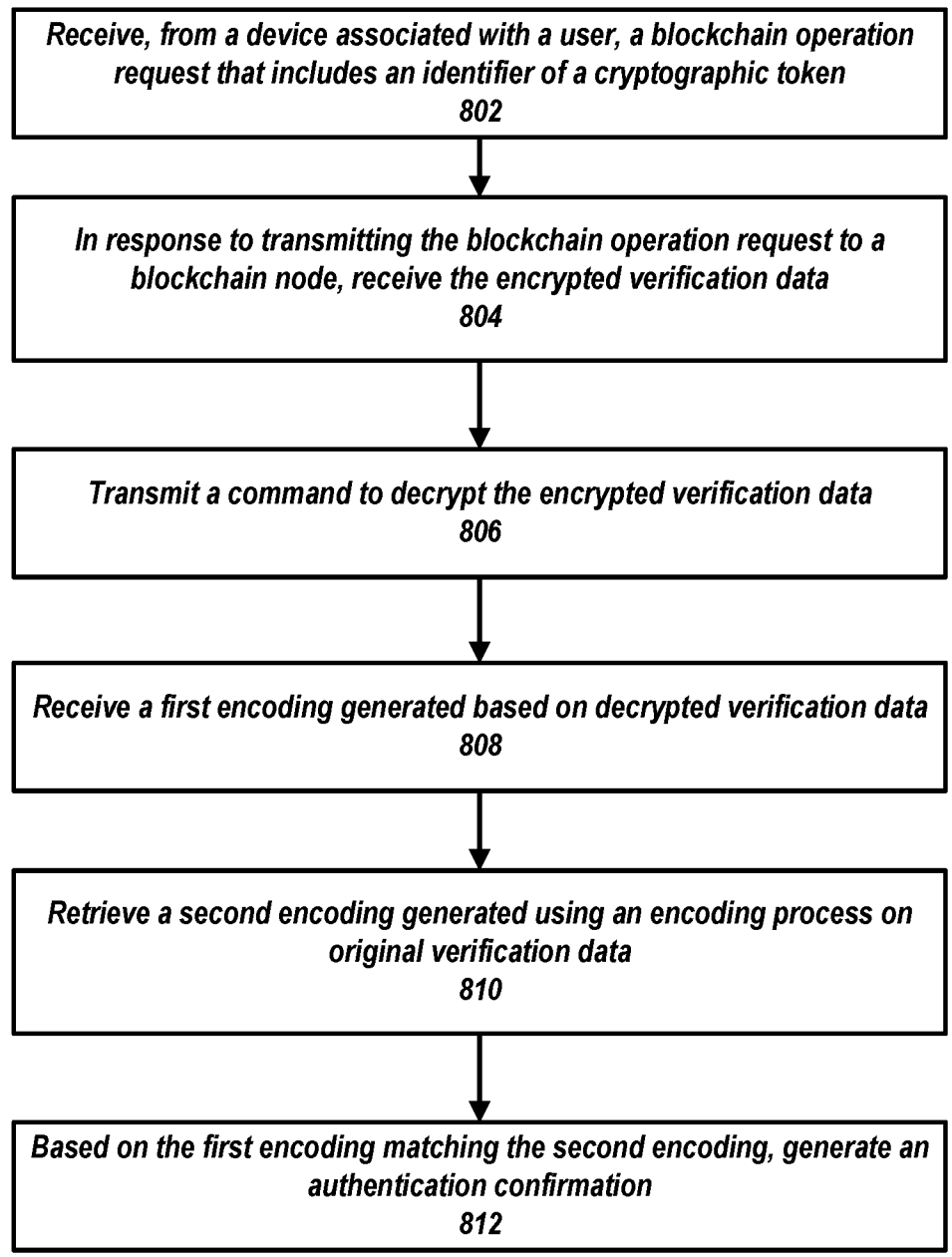
FIG. 8 is a flowchart of operations for anonymously sharing data using cryptographic tokens, in accordance with one or more embodiments of tis disclosure.

FIG. 8 is a flowchart 800 of operations for anonymously sharing data using cryptographic tokens. The operations of FIG. 8 may use components described in relation to FIG. 6 and/or FIG. 7. In some embodiments, access control system 102 may include one or more components of computer system 600. At 802, access control system 102 receives, from a device associated with a user, a blockchain operation request that includes an identifier of a cryptographic token. For example, the access control system 102 may receive the blockchain operation request from a device associated with a first cryptography-based storage application, such as cryptography-based storage applications 108a-108n. Access control system 102 may receive the blockchain operation request over network 150.

At 804, access control system 102, in response to transmitting the blockchain operation request to a blockchain node, receives the encrypted verification data. Access control system 102 may use one or more processors 610a, 610b, and/or 610n to perform this operation and may store the received encryption verification data in memory (e.g., system memory 620). At 806, access control system 102 transmits a command to decrypt the encrypted verification data. For example, the access control system 102 may use one or more processors 610a, 610b, and/or 610n and network interface 640 to transmit the command.

At 808, access control system 102 receives a first encoding generated based on decrypted verification data. For example, the access control system 102 may use one or more processors 610a, 610b, and/or 610n and network interface 640 to receive the encoding. Access control system 102 may receive the encoding over network 150 and store the encoding in memory (e.g., system memory 620). At 810, the access control system retrieves a second encoding generated using an encoding process on original verification data. For example, the access control system 102 may use one or more processors 610a, 610b, and/or 610n and network interface 640 to retrieve the second encoding. In some embodiments, access control system 102 may use a blockchain node to retrieve the second encoding from the cryptographic token. At 812, access control system 102, based on the first encoding matching the second encoding, generates an authentication confirmation. For example, the access control system 102 may use one or more processors 610a, 610b, and/or 610n to perform this operation.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, from a device associated with a cryptography-based storage application, a blockchain operation request, wherein the blockchain operation request comprises an identifier of a cryptographic token, and wherein the cryptographic token is associated with encrypted verification data encrypted using a public key associated with the cryptography-based storage application; in response to transmitting the blockchain operation request to a blockchain node, receiving, from an on-chain program associated with the cryptographic token, the encrypted verification data; transmitting, via the on-chain program, a command to decrypt the encrypted verification data; receiving a first encoding from the device, wherein the first encoding is generated based on decrypted verification data; retrieving a second encoding generated using an encoding process on original verification data; and based on the first encoding matching the second encoding, generating an authentication confirmation.
2. Any of the preceding embodiments, further comprising, based on the first encoding matching the second encoding, submitting the blockchain operation request to the blockchain node for performing a blockchain operation associated with the blockchain operation request.
3. Any of the preceding embodiments, further comprising: receiving, from a second device associated with a second cryptography-based storage application, a second blockchain operation request for generating the cryptographic token, wherein the second blockchain operation request comprises verification data and an address associated with the cryptography-based storage application; retrieving the public key associated with the cryptography-based storage application; encrypting the verification data using the public key associated with the cryptography-based storage application; generating the cryptographic token to store the encrypted verification data; and causing execution of a second blockchain operation based on the second blockchain operation request, wherein the second blockchain operation records the cryptographic token to a blockchain.
4. Any of the preceding embodiments, further comprising: receiving a token identifier associated with the cryptographic token; and transmitting the token identifier and the encoding process to be stored in the on-chain program.
5. Any of the preceding embodiments, further comprising: determining, using an application identifier associated with the second cryptography-based storage application, a user associated with the second cryptography-based storage application; generating an authorization request for the second blockchain operation request; and transmitting the authorization request to the user associated with the second cryptography-based storage application.
6. Any of the proceeding embodiments, wherein the blockchain operation request causes a plurality of cryptographic tokens to be assigned to be controlled by the cryptography-based storage application.
7. Any of the preceding embodiments, wherein retrieving the second encoding generated using the encoding process based on the original verification data comprises retrieving the second encoding from the cryptographic token.
8. Any of the preceding embodiments, wherein the device decrypts the encrypted verification data and generates the first encoding using the encoding process on the decrypted verification data.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.
12. A system comprising cloud-based circuitry for performing any of embodiments 1-8.

What is claimed is:
1. A method comprising:
receiving, from a device associated with a cryptography-based storage application, a blockchain operation request, wherein the blockchain operation request comprises an identifier of a cryptographic token, and wherein the cryptographic token is associated with encrypted verification data encrypted using a public key associated with the cryptography-based storage application;
in response to transmitting the blockchain operation request to a blockchain node, receiving, from an on-chain program associated with the cryptographic token, the encrypted verification data;
transmitting, via the on-chain program, a command to decrypt the encrypted verification data;
receiving a first encoding from the device, wherein the first encoding is generated based on decrypted verification data;
retrieving a second encoding generated using an encoding process on original verification data; and
based on the first encoding matching the second encoding, generating an authentication confirmation.
2. The method of claim 1, further comprising, based on the first encoding matching the second encoding, submitting the blockchain operation request to the blockchain node for performing a blockchain operation associated with the blockchain operation request.
3. The method of claim 1, further comprising:
receiving, from a second device associated with a second cryptography-based storage application, a second blockchain operation request for generating the cryptographic token, wherein the second blockchain operation request comprises verification data and an address associated with the cryptography-based storage application;
retrieving the public key associated with the cryptography-based storage application;
encrypting the verification data using the public key associated with the cryptography-based storage application;
generating the cryptographic token to store the encrypted verification data; and
causing execution of a second blockchain operation based on the second blockchain operation request, wherein the second blockchain operation records the cryptographic token to a blockchain.
4. The method of claim 3, further comprising:
receiving a token identifier associated with the cryptographic token; and
transmitting the token identifier and the encoding process to be stored in the on-chain program.
5. The method of claim 3, further comprising:
determining, using an application identifier associated with the second cryptography-based storage application, a user associated with the second cryptography-based storage application;
generating an authorization request for the second blockchain operation request; and
transmitting the authorization request to the user associated with the second cryptography-based storage application.

6. The method of claim 1, wherein the blockchain operation request causes a plurality of cryptographic tokens to be assigned to be controlled by the cryptography-based storage application.

7. The method of claim 1, wherein retrieving the second encoding generated using the encoding process based on the original verification data comprises retrieving the second encoding from the cryptographic token.

8. The method of claim 1, wherein the device decrypts the encrypted verification data and generates the first encoding using the encoding process on the decrypted verification data.

9. A non-transitory, computer-readable storage medium storing instructions that, when executed by one or more processors, cause the one or more processors to perform operations comprising:
　　receiving, from a device associated with a cryptography-based storage application, a blockchain operation request, wherein the blockchain operation request comprises an identifier of a cryptographic token, and wherein the cryptographic token is associated with encrypted verification data encrypted using a public key associated with the cryptography-based storage application;
　　in response to transmitting the blockchain operation request to a blockchain node, receiving, from an on-chain program associated with the cryptographic token, the encrypted verification data;
　　transmitting, via the on-chain program, a command to decrypt the encrypted verification data;
　　receiving a first encoding from the device, wherein the first encoding is generated based on decrypted verification data;
　　retrieving a second encoding generated using an encoding process on original verification data; and
　　based on the first encoding matching the second encoding, generating an authentication confirmation.

10. The non-transitory, computer-readable storage medium of claim 9, wherein the instructions further cause the one or more processors to, based on the first encoding matching the second encoding, submit the blockchain operation request to the blockchain node for performing a blockchain operation associated with the blockchain operation request.

11. The non-transitory, computer-readable storage medium of claim 9, wherein the instructions further cause the one or more processors to perform operations comprising:
　　receiving, from a second device associated with a second cryptography-based storage application, a second blockchain operation request for generating the cryptographic token, wherein the second blockchain operation request comprises verification data and an address associated with the cryptography-based storage application;
　　retrieving the public key associated with the cryptography-based storage application;
　　encrypting the verification data using the public key associated with the cryptography-based storage application;
　　generating the cryptographic token to store the encrypted verification data; and
　　causing execution of a second blockchain operation based on the second blockchain operation request, wherein the second blockchain operation records the cryptographic token to a blockchain.

12. The non-transitory, computer-readable storage medium of claim 11, wherein the instructions further cause the one or more processors to perform operations comprising:
　　receiving a token identifier associated with the cryptographic token; and
　　transmitting the token identifier and the encoding process to be stored in the on-chain program.

13. The non-transitory, computer-readable storage medium of claim 11, wherein the instructions further cause the one or more processors to perform operations comprising:
　　determining, using an application identifier associated with the second cryptography-based storage application, a user associated with the second cryptography-based storage application;
　　generating an authorization request for the second blockchain operation request; and
　　transmitting the authorization request to the user associated with the second cryptography-based storage application.

14. The non-transitory, computer-readable storage medium of claim 9, wherein the blockchain operation request causes a plurality of cryptographic tokens to be assigned to be controlled by the cryptography-based storage application.

15. The non-transitory, computer-readable storage medium of claim 9, wherein the instructions for retrieving the second encoding generated using the encoding process based on the original verification data further cause the one or more processors to retrieve the second encoding from the cryptographic token.

16. The non-transitory, computer-readable storage medium of claim 9, wherein the device decrypts the encrypted verification data and generates the first encoding using the encoding process on the decrypted verification data.

\* \* \* \* \*